(12) United States Patent
Ellisor, Jr.

(10) Patent No.: US 8,504,683 B2
(45) Date of Patent: *Aug. 6, 2013

(54) SYSTEM AND METHOD FOR MANAGING IT ASSETS

(75) Inventor: Charles Edwin Ellisor, Jr., Bonham, TX (US)

(73) Assignee: CA, Inc., Islandia, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/813,320

(22) Filed: Jun. 10, 2010

(65) Prior Publication Data

US 2010/0312597 A1 Dec. 9, 2010

Related U.S. Application Data

(63) Continuation of application No. 11/694,240, filed on Mar. 30, 2007, now Pat. No. 7,747,738.

(51) Int. Cl.
*G06F 15/177* (2006.01)

(52) U.S. Cl.
USPC .............................. 709/224; 709/223; 705/28

(58) Field of Classification Search
USPC ..................................... 709/224, 223; 705/28
See application file for complete search history.

(56) References Cited

U.S. PATENT DOCUMENTS

| 6,125,391 | A | * | 9/2000 | Meltzer et al. | 709/223 |
| 6,748,382 | B1 | * | 6/2004 | Mohan et al. | 1/1 |
| 7,747,738 | B2 | * | 6/2010 | Ellisor, Jr. | 709/224 |
| 2003/0154199 | A1 | * | 8/2003 | Thomas et al. | 707/10 |
| 2003/0172020 | A1 | * | 9/2003 | Davies et al. | 705/36 |
| 2003/0233287 | A1 | * | 12/2003 | Sadler et al. | 705/28 |
| 2008/0086391 | A1 | * | 4/2008 | Maynard et al. | 705/28 |

\* cited by examiner

*Primary Examiner* — Kenneth R Coulter
(74) *Attorney, Agent, or Firm* — Pillsbury Winthrop Shaw Pittman LLP

(57) ABSTRACT

A system configured to manage IT assets associated with an entity (e.g., a company, an institution, etc.), in accordance with one or more embodiments of the invention. The IT assets may include hardware assets, software assets, telecommunications assets, and/or other IT assets. The system enables substantially all of the information relevant to the individual IT assets to be organized within a single repository throughout the life cycle of the IT assets (e.g., from order to disposal). By organizing the relevant information within a single repository, automation and dynamic system interaction may be leveraged during the life cycle of a given IT asset to track and/or monitor the given IT asset with an enhanced efficiency. In some embodiments, the system may include a common database, and an asset implementation manager, an asset ownership manager, an asset process manager, a service manager in operative communication with the common database.

14 Claims, 14 Drawing Sheets

SYSTEM AND METHOD FOR MANAGING IT ASSETS

CROSS-REFERENCE TO RELATED APPLICATIONS

This application is a continuation of U.S. patent application Ser. No. 11/694,240, filed Mar. 30, 2007, now U.S. Pat. No. 7,747,738, the contents of which are hereby incorporated herein in its entirety.

FIELD OF THE INVENTION

The invention relates to IT asset management, and more particularly to IT asset management that employs a common database that stores information related to IT assets throughout the IT asset lifecycle.

BACKGROUND OF THE INVENTION

Typically IT assets associated with a single IT infrastructure for an entity such as a company, an institution, or other organization are managed by a set of discrete systems that deal with different aspects of IT asset management. For instance, one system may facilitate orders of new IT assets and procurement of those assets. Another system may manage implementation of the IT assets in the IT infrastructure. Another system may manage issues reported by users of failures by the IT infrastructure and/or assets. These and other systems may operate distinctly (or substantially so) from each other such that no (or minimal) information about the managed IT assets may be exchanged between the systems. This may lead to duplicative storage of the information, inconsistencies in the stored information of the various systems, and other inefficiencies. Further, the information generated by one system may not be leveraged by another to enhance automation and increase efficiency. Other drawbacks associated with systems that manage various aspects of the life cycle of IT assets also exist.

SUMMARY

One aspect of the invention relates to a system configured to manage IT assets associated with an entity (e.g., a company, an institution, etc.), in accordance with one or more embodiments of the invention. The IT assets may include hardware assets, software assets, telecommunications assets, and/or other IT assets. The system enables substantially all of the information relevant to the individual IT assets to be organized within a single repository throughout the life cycle of the IT assets (e.g., from order to disposal). By organizing the relevant information within a single repository, automation and dynamic system interaction may be leveraged during the life cycle of a given IT asset to track and/or monitor the given IT asset with an enhanced efficiency. In some embodiments, the system may include a common database, and an asset implementation manager, an asset ownership manager, an asset process manager, a service manager in operative communication with the common database. In some instances, the system may include a web server, a network, and/or other components.

By incorporating information generated and/or obtained by the various managers into profiles within common database that correspond to individual ones of the IT assets, information related to the IT assets may be normalized and organized with an enhanced efficiency. This may reduce an overall amount of storage in comparison with a system in which one or more the of managers references only its own information to execute its designated functionality (e.g., is not effectively connected to the common database for operative communication therewith). Further, any information that is input to the system at the request of one of the managers is captured within the profiles stored in the common database such that subsequent calls for the information (e.g., by another one of the managers) may be satisfied in an automated manner by simply referencing the common database. Still further, information that is generated and/or obtained by one of managers is not held and stored by the system solely for the use of the generating manager. Instead, this information may be stored within the common database to be accessible to other ones of the managers.

According to various embodiments, the common database may be configured to store the information relevant to the IT assets. The common database may be organized to include asset profiles that correspond to the IT assets. For example, individual ones of the profiles may correspond to individual ones of the IT assets. The profile of a given IT asset may include an identification of the given IT asset, and the other information that is generated and/or managed by the various managers of the system. It should be appreciated that while the common database may be a single database structure, the storage and processing functionality associated with the common database may be provided by a plurality of processing and/or storage components. In some embodiments, the common database may include a relational database. For example, the common database may be managed by a relational database management system such as SQL (or some derivative thereof), Ingres (or some derivative thereof), or some other relational database management system.

The common database may be in operative communication with the asset implementation manager, the asset ownership manager, the asset process manager, and the service manager such that the managers may access information stored within the profiles of the common database. Accessing information stored within the profiles may include retrieving information, adding information, modifying information, and/or otherwise accessing information. The operative communication between the managers and the common database may be accomplished via virtually any suitable media. For example, this communication may be accomplished by a wireless medium, a wired medium, by discrete connections, by connections accomplished through a network, and/or other communication media.

According to various embodiments, the asset implementation manager may be configured to manage the implementation of the IT assets. The implementation of the IT assets may include, for example, the configuration, deployment, capabilities, availability (e.g., of an asset itself or of a capability of the asset, such memory), physical location, network location, end-user assignment, usage, and/or other information related to the implementation of the IT assets. In some instances, the asset implementation manager may provide functionality to enable tracking of the IT assets, such as automated discovery of IT assets, hardware inventory, software inventory, network inventory, configuration management, software usage monitoring, and/or other functionality.

Information obtained by the asset implementation manager related to the implementation of a given IT asset may be used to create and/or update the profile associated with the given IT asset within the common database. For example, if asset implementation manager discovers a previously unknown IT asset, a new profile associated with the discovered IT asset may be created in the common database. The new profile may include the name of the IT asset, the physical location of the discovered IT asset, the network location of the discovered IT asset, and an asset type of the discovered IT asset (e.g., a hardware asset, a software asset, a network asset, etc.), and/or other information obtained by the asset implementation manager during the discovery of the discovered IT asset. The asset implementation manager, may, in some cases, determine other information associated with the discovered IT asset during or subsequent to discovery, such as a configuration of the IT asset and/or other information associated with the discovered IT asset. This information may be added to the profile created for the discovered IT asset. Subsequent to discovery, the asset implementation manager may monitor various aspects of the discovered IT asset, and may update information within the profile based on this monitoring. For example, information related to usage, configuration, availability, and/or other information related to one or more aspects of the discovered IT asset may be monitored to enable information within the profile associated with the discovered IT asset to be updated.

In some embodiments, the asset ownership manager may be configured to manage information related to the ownership of the IT assets. Managing information related to the ownership of the IT assets may include associating individual ones of the IT assets with the corresponding ownership information. The ownership information may include detailed ownership information throughout the asset life cycle, from planning and requisition of the assets to retirement and physical disposal. For example, the ownership information may include one or more of cost information, information related to contractual rights and/or obligations associated with the IT assets, information related to one or more leases associated with the IT assets, information related to one or more licenses associated with the IT assets, information related to one or more vendors associated with the IT assets, and/or other information related to the ownership of the IT assets.

According to various embodiments, the asset process manager may be configured to manage one or more processes associated with the IT assets. Managing the one or more processes associated with the IT assets may include one or more of receiving a command to initiate a process, initiating a process, monitoring a process, requesting one or more authorizations for a process, receiving one or more authorizations for a process, determining a process has been completed, and/or otherwise managing a process. The one or more processes associated with the IT assets may include one or more of an order, a procurement, a receipt, a payment, a configuration change, a deployment, a disposal, and/or other processes.

In some instances, managing a process may include interacting with one or more users and/or administrators. This interaction may include receiving an authorization, receiving a command, conveying a request, conveying status information, conveying that a process has ended, and/or other interactions. Some of these interactions with users related to one or more processes will be discussed below.

One aspect of the functionality of the asset process manager may include managing a work flow of one or more processes. Management of the work flow of one or more processes may include automating aspects of the one or more processes and their timing such that documents, information, tasks, and/or other information are passed from one participant (e.g., an IT asset, a user, an administrator, etc.) to another in a way that may be governed by one or more predetermined rules and/or procedures. Activities managed by the asset process manager to pass information between participants may include one or more of an invocation of external applications and/or services, a database query, sending and/or receiving an electronic message (e.g., an email), and/or other activities.

Another aspect of the functionality of the asset process manager may include managing one or more predetermined rules and/or procedures. This may include providing for automated and/or manual rule definition and/or editing. In some instances, the rules and/or procedures may include one or more of identifying users and/or groups of users, locking, checking-in, checking-out, versioning, rolling-back, controlling effective dating of rules and/or procedures, and/or other rules and/or procedures.

In some embodiments, the service manager may be configured to manage issues related to the functionality of one or more of the IT assets that are reported by one or more users of the IT assets. Managing an issue related to the functionality of a given IT asset may include one or more of receiving a report of the issue, initiating one or more processes to address the issue (e.g., by communicating an initiation of the process to the asset process manager), monitoring one or more processes that address the issue (e.g., by monitoring status information generated by the asset process manager), closing the issue (e.g., once the issue has been resolved), and/or otherwise managing the issue. The service manager may manage issues based at least in part on information stored in the profiles of the common database, and may provide information to be stored in the profiles of the common database related to the manner and efficacy with which the issues are addressed.

In some instances, an issue related to the functionality of an IT asset may be reported by a user through the submission of a "trouble ticket" to the service manager that includes various information related to some dysfunction of the IT asset. For instance, the trouble ticket may include a perceived problem with the functionality of the IT asset, a time (or times) at which the problem was observed, a possible impact of the problem, an identity of the IT asset, an identity of the user submitting the trouble ticket, and/or other information. The service manager may provide some or all of the information included in a received trouble ticket to the common database to be stored in the profile of the IT asset(s) that corresponds to the received trouble ticket. As an alternative, the service manager may verify the information in the received trouble tick prior to providing the information to be stored in the profiles.

According to various embodiments, the web server provides access to the system for one or more users and/or administrators via the network. For example, a browser-based interface may be provided to the one or more users and/or administrators using client terminals. A given client terminal may include a desktop computer, a laptop computer, a handheld computer, and/or other terminal devices.

In some embodiments, the interface provided to users and/or administrators may be organized according to the types of interactions that a particular user and/or administrator will typically have with the system. For example, users and/or administrators may be organized into a plurality of predetermined categories. In some instances, the categories may be customized to include provide additional and/or less access to information and/or functionality. The categories of users and/or administrators may include one or more of an end-user, a business administrator, a configuration administrator, a desktop support administrator, a procurement administrator, a service support administrator, a vendor administrator, and/or other users and/or administrators. Since the types of activities that will typically be performed by these different users and/or administrators with respect to the system may vary based on their role in various processes related to the IT assets (e.g., processes managed by the asset process manager), the interface provided to each of the different types of users and/or administrators may be tailored to enable access to information (e.g., information stored within the profiles of the common database) deemed to be most relevant the particular types of users and/or administrators.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
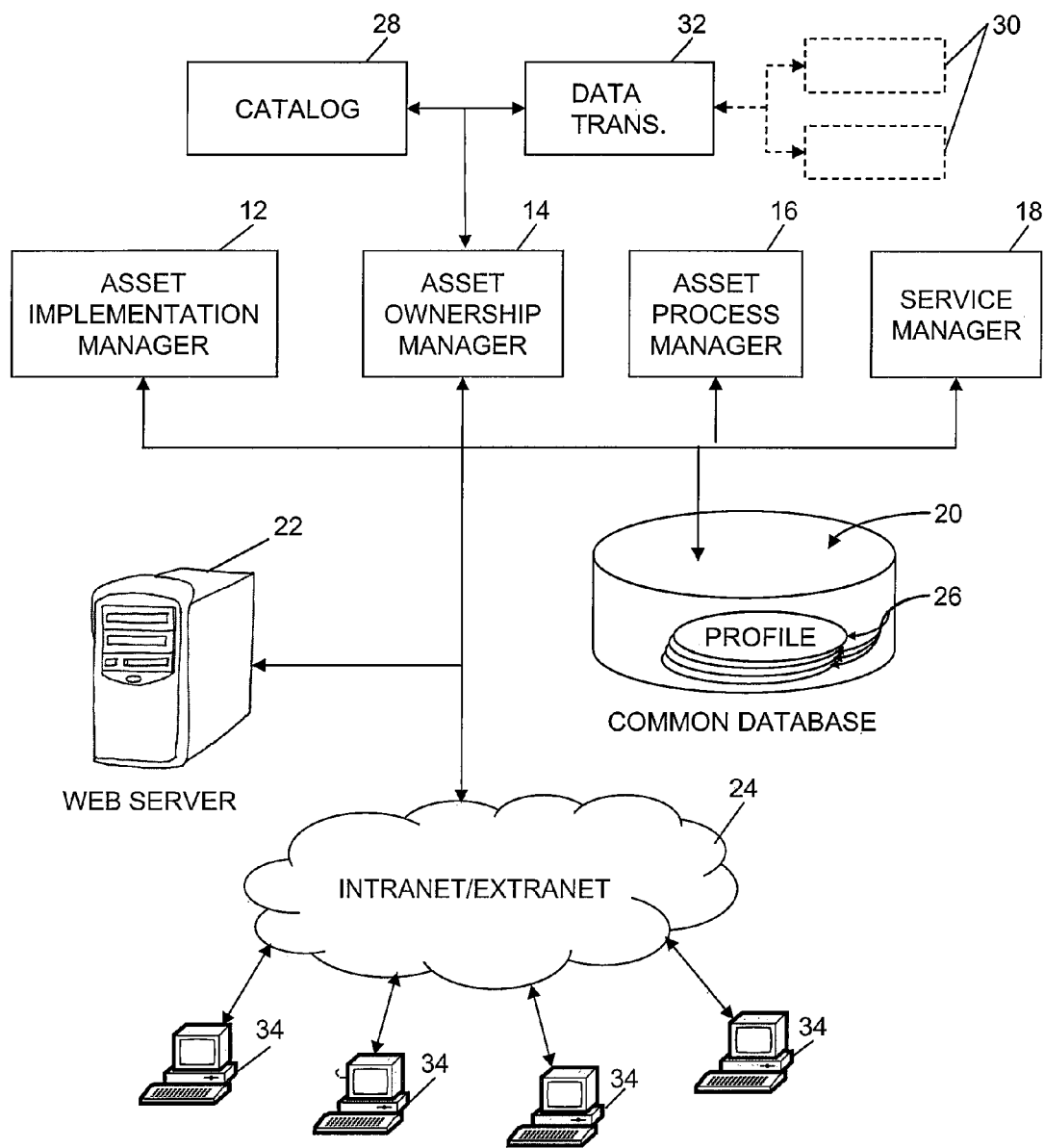
FIG. 1 illustrates a system configured to manage IT assets associated with an entity, according to one or more embodiments of the invention.

FIG. 1 illustrates a system 10 configured to manage IT assets associated with an entity (e.g., a company, an institution, etc.), in accordance with one or more embodiments of the invention. The IT assets may include hardware assets (e.g., desktop computers, laptop computers, handheld computers, servers, etc.), software assets (e.g., operating systems, applications, etc.), telecommunications assets (e.g., an automatic call distributor, an interactive voice response unit, a port switch, an internet protocol switch, etc.), and/or other IT assets. System 10 enables substantially all of the information relevant to the individual IT assets to be organized within a single repository throughout the life cycle of the IT assets (e.g., from order to disposal). By organizing the relevant information within a single repository, automation and dynamic system interaction may be leveraged during the life cycle of a given IT asset to track and/or monitor the given IT asset with an enhanced efficiency. In some embodiments, system 10 may include an asset implementation manager 12, an asset ownership manager 14, an asset process manager 16, a service manager 18, a common database 20, a web server 22, a network 24, and/or other components.

According to various embodiments, common database 20 may be configured to store the information relevant to the IT assets. Common database 20 may be organized to include asset profiles 26 that correspond to the IT assets. For example, individual ones of profiles 26 may correspond to individual ones of the IT assets. The profile 26 of a given IT asset may include an identification of the given IT asset, and the other information that is generated and/or managed by managers 12, 14, 16, and 18 (e.g., as is discussed further below). It should be appreciated that while common database 20 may be a single database structure, the storage and processing functionality associated with common database 20 may be provided by a plurality of processing and/or storage components. In some embodiments, common database 20 may include a relational database. For example, common database 20 may be managed by a relational database management system such as SQL (or some derivative thereof), Ingres (or some derivative thereof), or some other relational database management system.

Common database 20 may be in operative communication with managers 12, 14, 16, and 18 such that managers 12, 14, 16, and 18 may access information stored within profiles 26 of common database 20. Accessing information stored within profiles 26 may include retrieving information, adding information, modifying information, and/or otherwise accessing information. The operative communication between managers 12, 14, 16, and 18, and common database 20 may be accomplished via virtually any suitable media. For example, this communication may be accomplished by a wireless medium, a wired medium, by discrete connections, by connections accomplished through a network, and/or other communication media.

In some embodiments of the invention, managers 12, 14, 16, and 18 may be implemented as processors capable of executing operations and/or algorithms, to provide some or all of the functionality addressed below. For example, one or more of managers 12, 14, 16, and 18 may include one or more application servers. Although managers are shown in FIG. 1 as being discrete entities with a single component, it should be appreciated that this is for illustrative purposes only. For example, in some instances, one of managers 12, 14, 16, and 18 may be implemented on a plurality of processing components. As another example, a plurality of managers 12, 14, 16, and 18 may be implemented on a common processing component(s).

According to various embodiments, asset implementation manager 12 may be configured to manage the implementation of the IT assets. The implementation of the IT assets may include, for example, the configuration, deployment, capabilities, availability (e.g., of an asset itself or of a capability of the asset, such memory), physical location, network location, end-user assignment, usage, and/or other information related to the implementation of the IT assets. In some instances, asset implementation manager 12 may provide functionality to enable tracking of the IT assets, such as automated discovery of IT assets, hardware inventory; software inventory, network inventory, configuration management, software usage monitoring, and/or other functionality. In some embodiments, asset implementation manager 12 may include Unicenter® Desktop & Server Management, produced by Computer Associates™, and in particular, the Unicenter® Asset Manager Component.

Information obtained by asset implementation manager 12 related to the implementation of a given IT asset may be used to create and/or update the profile 26 associated with the given IT asset within common database 20. For example, if asset implementation manager 12 discovers a previously unknown IT asset, a new profile 26 associated with the discovered IT asset may be created in common database 20. The new profile 26 may include the name of the IT asset, the physical location of the discovered IT asset, the network location of the discovered IT asset, and an asset type of the discovered IT asset (e.g., a hardware asset, a software asset, a network asset, etc.), and/or other information obtained by asset implementation manager 12 during the discovery of the discovered IT asset. Asset implementation manager 12, may, in some cases, determine other information associated with the discovered IT asset during or subsequent to discovery, such as a configuration of the IT asset and/or other information associated with the discovered IT asset. This information may be added to the profile 26 created for the discovered IT asset. Subsequent to discovery, asset implementation manager 12 may monitor various aspects of the discovered IT asset, and may update information within the profile 26 based on this monitoring. For example, information related to usage, configuration, availability, and/or other information related to one or more aspects of the discovered IT asset may be monitored to enable information within the profile 26 associated with the discovered IT asset to be updated.

In some embodiments, asset ownership manager 14 may be configured to manage information related to the ownership of the IT assets. Managing information related to the ownership of the IT assets may include associating individual ones of the IT assets with the corresponding ownership information. The ownership information may include detailed ownership information throughout the asset life cycle, from planning and requisition of the assets to retirement and physical disposal. For example, the ownership information may include one or more of cost information, information related to contractual rights and/or obligations associated with the IT assets, information related to one or more leases associated with the IT assets, information related to one or more licenses associated with the IT assets, information related to one or more vendors associated with the IT assets, and/or other information related to the ownership of the IT assets. In one or more embodiments, asset ownership manager 14 includes Unicenter® Asset Portfolio Manager, produced by Computer Associates™.

Asset ownership manager 14 may be in communication with one or more information sources related to the IT assets. For example, the one or more information sources may include a catalog 28, a procurement system, and/or other information sources 30. Catalog 28 may include an enterprise specific catalog that enables end-users and/or administrators to place requests for IT assets for which they have need. A procurement system may include hardware and/or software that interfaces with one or more vendors to effect transfer of IT assets from the vendor. In some instances, the one or more information sources may communicate with asset ownership manager 14 via a data transformation module 32. Data transformation module 32 may format information relayed between the one or more information sources and asset ownership manager 14 to enable the communication therebetween. For example, data transformation module 32 may provide some or all of the functionality of the Advantage Data Transformer, a product of Computer Associates™.

Information obtained by asset ownership manager 14 may be stored to profiles 26 within common database 20. The information may be obtained by manual entry by one or more users and/or administrators, by electronic entry (e.g., via electronically readable code, such as optical codes and/or magnetic codes), and/or by other mechanisms. In some instances, information related to ownership may be transferred to asset ownership manager 14 from the one or more external information sources (e.g., catalog 28, other information source 30). Information may be provided to the profile 26 of a given IT asset by asset ownership manager 14 as the given IT asset proceeds throughout its lifecycle. The information provided to the profile 26 of the given IT asset by asset ownership manager 14 may be accessed by accessing the profile 26 of the given IT asset.

According to various embodiments, asset process manager 16 may be configured to manage one or more processes associated with the IT assets. Managing the one or more processes associated with the IT assets may include one or more of receiving a command to initiate a process, initiating a process, monitoring a process, requesting one or more authorizations for a process, receiving one or more authorizations for a process, determining a process has been completed, and/or otherwise managing a process. The one or more processes associated with the IT assets may include one or more of an order, a procurement, a receipt, a payment, a configuration change, a deployment, a disposal, and/or other processes. In some instances, asset process manager 16 may include some or all of the functionality of CleverPath™ Aion®, produced by Computer Associates™.

In order to manage the one or more processes, asset process manager 16 may manage information stored within the profiles 26 of the IT assets. For example, if the process includes a configuration change for all IT assets having a first configuration to be put into a second configuration asset process manager 16 may identify the portfolios 26 that correspond to the IT assets that have the first configuration. Subsequent to the execution of the process that places the IT assets into the second configuration, asset process manager 16 may update the profiles 26 to indicate that these IT assets now have the second configuration. In some instances, asset process manager 16 may provide the information to the profiles 26 such that a given one of the identified profiles 26 indicates the previous configuration of the corresponding IT asset (e.g., the first configuration), and the date that the configuration was changed to the second configuration. As another example the end user to whom a given IT asset has been assigned may change the configuration of the given IT asset. In such instances, the profile 26 that corresponds to the given IT asset may be updated to indicate the previous configuration of the given IT asset and the date that the configuration was changed by the end user.

In some instances, managing a process may include interacting with one or more users and/or administrators. This interaction may include receiving an authorization, receiving a command, conveying a request, conveying status information, conveying that a process has ended, and/or other interactions. Some of these interactions with users related to one or more processes will be discussed below.

One aspect of the functionality of asset process manager 16 may include managing a work flow of one or more processes. Management of the work flow of one or more processes may include automating aspects of the one or more processes and their timing such that documents, information, tasks; and/or other information are passed from one participant (e.g., an IT asset, a user, an administrator, etc.) to another in a way that may be governed by one or more predetermined rules and/or procedures. Activities managed by asset process manager 16 to pass information between participants may include one or more of an invocation of external applications and/or services, a database query, sending and/or receiving an electronic message (e.g., an email), and/or other activities.

Another aspect of the functionality of asset process manager 16 may include managing one or more predetermined rules and/or procedures. This may include providing for automated and/or manual rule definition and/or editing. In some instances, the rules and/or procedures may include one or more of identifying users and/or groups of users, locking, checking-in, checking-out, versioning, rolling-back, controlling effective dating of rules and/or procedures, and/or other rules and/or procedures.

In some embodiments, service manager 18 may be configured to manage issues related to the functionality of one or more of the IT assets that are reported by one or more users of the IT assets. Managing an issue related to the functionality of a given IT asset may include one or more of receiving a report of the issue, initiating one or more processes to address the issue (e.g., by communicating an initiation of the process to asset process manager 16), monitoring one or more processes that address the issue (e.g., by monitoring status information generated by asset process manager 16), closing the issue (e.g., once the issue has been resolved), and/or otherwise managing the issue. Service manager 18 may manage issues based at least in part on information stored in profiles 26 of common database 20, and may provide information to be stored in profiles 26 of common database 20 related to the manner and efficacy with which the issues are addressed. In various embodiments, service manager 18 may include some or all of the functionality of Unicenter Service Desk, produced by Computer Associates™.

In some instances, an issue related to the functionality of an IT asset may be reported by a user through the submission of a "trouble ticket" to service manager 18 that includes various information related to some dysfunction of the IT asset. For instance, the trouble ticket may include a perceived problem with the functionality of the IT asset, a time (or times) at which the problem was observed, a possible impact of the problem, an identity of the IT asset, an identity of the user submitting the trouble ticket, and/or other information. Service manager 18 may provide some or all of the information included in a received trouble ticket to common database 20 to be stored in the profile 26 of the IT asset(s) that corresponds to the received trouble ticket. As an alternative, service manager 18 may verify the information in the received trouble tick prior to providing the information to be stored in profiles 26.

As was mentioned above, to address an issue related to the functionality of a given IT asset that has been reported by a user (e.g., via a trouble ticket), service manager 18 may initiate one or more processes. To determine whether to initiate a process (and which process(es) to initiate), service manager 18 may access information within the profile 26 that corresponds to the given IT asset. If one or more processes are invoked to address the issue, service manager 18 may monitor the one or more processes (e.g., via information provided to common database 20 and/or service manager 18 by asset process manager 16). This may enable one or more users (e.g., the reporting user) to request status information from service manager 18 that pertains to individual processes initiated to address the issue, as well as status information related to the overall issue.

According to various embodiments, web server 22 provides access to system 10 for one or more users and/or administrators via network 24. For example, a browser-based interface may be provided to the one or more users and/or administrators using client terminals 34. A given client terminal 34 may include a desktop computer, a laptop computer, a handheld computer, and/or other terminal devices.

In some embodiments, the interface provided to users and/or administrators may be organized according to the types of interactions that a particular user and/or administrator will typically have with system 10. For example, users and/or administrators may be organized into a plurality of predetermined categories. In some instances, the categories may be customized to include provide additional and/or less access to information and/or functionality. The categories of users and/or administrators may include one or more of an end-user, a business administrator, a configuration administrator, a desktop support administrator, a procurement administrator, a service support administrator, a vendor administrator, and/or other users and/or administrators. Since the types of activities that will typically be performed by these different users and/or administrators with respect to, system 10 may vary based on their role in various processes related to the IT assets (e.g., processes managed by asset process manager 16), the interface provided to each of the different types of users and/or administrators may be tailored to enable access to information (e.g., information stored within profiles 26 of common database 20) deemed to be most relevant the particular types of users and/or administrators.

An end-user (or "requester") may include any user that accesses and/or uses an IT/business structure provided by the IT assets of the entity. The end-users may primarily act as request initiators. For example, an end-user may request a new IT asset, a replacement of an existing IT asset, a change (e.g., a change of configuration, a change of location, etc.), and/or other requests. The end-users may report issues related to the functionality of IT assets (e.g., to service manager 18). Once a request has been initiated, or an issue has been reported, by an end-user, an end-user may monitor the status of the request and/or the issue based on updates forwarded to the end-user via the interface provided by system 10.

A business administrator may be responsible for planning and execution of strategic business initiatives of the entity. The business administrator may accomplish this function through analysis, of business goals, objectives and needs. For example, the business administrator may develop periodic business objectives and monitor business unit progress against developed objectives. In order to fulfill this role, the business administrator may define services and capabilities needed from the IT assets associated with the entity in order to meet the developed objectives. Accordingly, the business administrator may initiate requests related to the IT assets, and may function as an approver within processes related to the IT assets (e.g., processes managed by asset process manager 16).

A configuration administrator work to ensure that the overall functionality of the IT assets associated with the entity meet predetermined performance objectives and/or needs. This may include implementing the entity's Configuration Management policy and standards, which typically includes specifying the versions of configuration items in use and in existence on the IT assets, and information on the status of the configuration items (e.g., ownership information related to the configuration items, relationships between the configuration items, timing information, etc.). The configuration administrator may control changes to the configuration items by ensuring changes are made with the authorization of appropriate other users and/or administrators. System 10 may enable the configuration administrator to audit the IT infrastructure provided by the IT assets to ensure that the IT assets include authorized configuration items. The interface provided to a configuration administrator to evaluate existing Configuration Management systems may enable the configuration administrator to research and respond to requests generated by other users and/or administrators for equipment, changes, audits, and/or other requests. By leveraging the capabilities of system 10, the configuration administrator may reports (the format of which may be customizable) related to the compliance of the IT assets with the predetermined Configuration Management policy and standards. System 10 may enable the configuration administrator to view financial and contractual information related to the IT assets as necessary.

A desktop support administrator may be responsible for deploying and maintaining the IT assets related to various personal computer included in the IT assets. For example, the desktop support administrator may be responsible for desktop computers, laptop computers, and/or other personal computers, and for the IT assets that are implemented on these computers (e.g., software, peripherals, etc.). The desktop support administrator may leverage system 10 to establish configuration standards (e.g., in coordination with a configuration administrator) related to personal computers associated with the entity and the other IT assets associated with the personal computers. The interface provided by system 10 to the desktop support administrator may enable the desktop support administrator to ensure that end users of the personal computers are aware of established policies and standards (e.g., configuration standards) associated with the personal computers. Desktop support administrator may further interact with system 10 to ensure that issues related to functionality of the IT assets that are reported by users are being resolved effectively and/or efficiently by service manager 18, and/or to generate reports regarding one or more aspects of the personal computers (and their associated peripherals).

A procurement administrator may be responsible for the procurement of IT assets by the entity. This may include identifying, evaluating, and negotiating with suppliers, auditing terms and conditions of contracts and leases related to the IT assets for compliance with company policies, and ensuring compliance with regulatory statutes. Through interacting with system 10, the procurement administrator may approve purchases from vendors, ensure that vendors receive appropriate and timely compensation, and negotiating and establishing master contracts with various vendors.

A service support administrator may be responsible for the whole of the IT infrastructure provided to the entity by the IT assets. For example, the service support administrator may interact with system 10 to oversee the maintenance of change management processes related to the IT assets to ensure compliance with predetermined change management procedures and policies. This may include monitoring ongoing change processes related to the IT assets. The interface provided to the service support administrator by system 10 may enable the service support administrator to oversee the management of the resolution of issues related to the IT assets that are reported by users and/or administrators, changes to configuration items to be deployed on the IT assets, and/or other modifications to the IT infrastructure provided by the IT assets.

A vendor administrator may be responsible for the actual purchase of the IT assets from vendors. This may include evaluating supplier quotes and services to determine the most desirable vendors, reviewing, revising and negotiating licenses and/or agreements associated with the purchase of the IT assets, identifying cost savings and reduction opportunities, evaluating vendor performance, and/or other tasks associated with the purchase of the IT assets. In processes involving the acquisition of the IT assets (e.g., processes managed by asset process manager 16), the vendor administrator may execute tasks in the workflows of such processes that include communication and interaction with outside vendors.

It should be appreciated that within an entity, a single person may function as more than one of the users and/or administrators described above. In some instances, system 10 may enable such a person to select an interface that corresponds to the manner in which the person would like to interact with system 10. For example, the person may want to request a new laptop computer, and may access an interface provided by system 10 for an end user. However, upon completion of this task, the person may perform various functionalities associated with an administrator (e.g., the business administrator, the configuration administrator, etc.) by accessing corresponding interface. Some or all of the interfaces provided to the users and/or administrators may be self-service browser-based interfaces that may be accessed by the users and/or administrators via web server 22. It should be appreciated from the description of system 10 provided above, that each interface may enable the users and/or administrators to access system 10, and the information within profiles 26 of common database 20, in a different manner. In some instances, system 10 may include a login module (not shown) that will enable the appropriate individuals within the entity to access the interface(s) that correspond to their role(s) in the entity.

Figure 2:
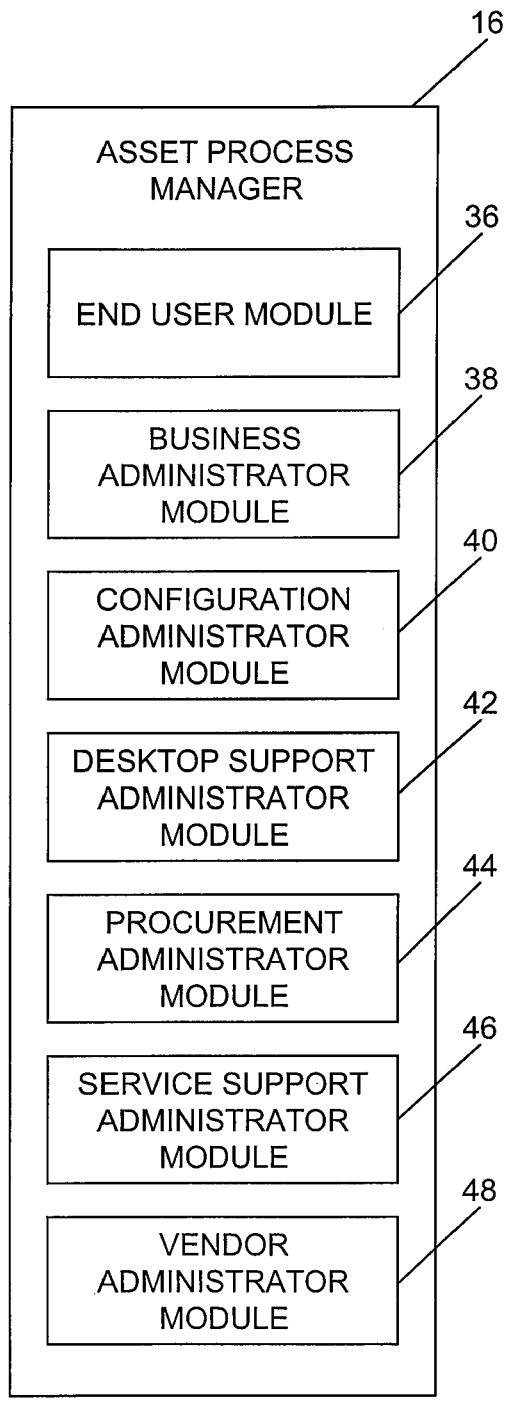
FIG. 2 illustrates an asset process manager, in accordance with one or more embodiments of the invention.
Figure 3:
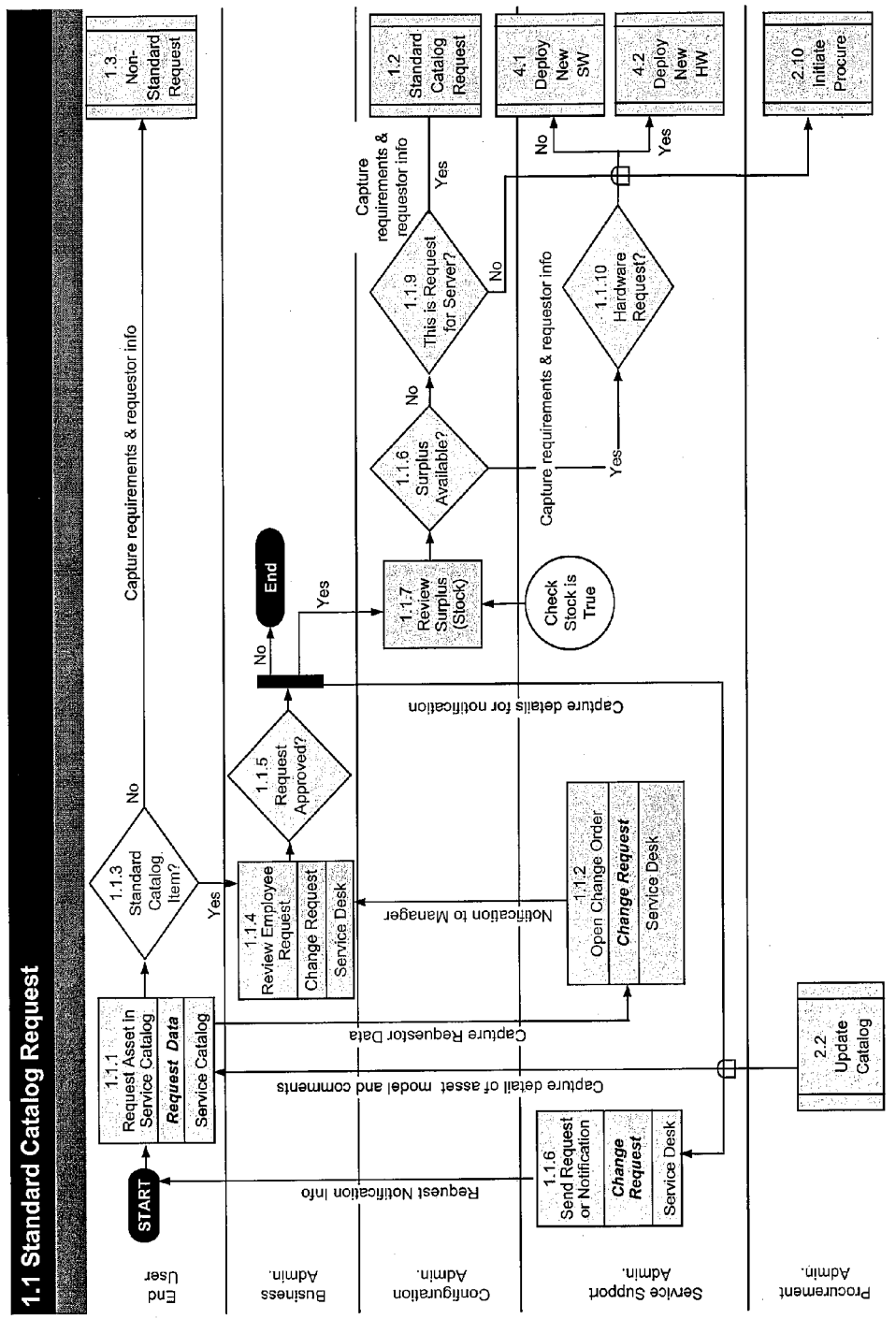
FIG. 3 illustrates a standard catalog request process that can be executed by a system configured to manage IT assets associated with an entity, according to one or more embodiments of the invention.
Figure 4:
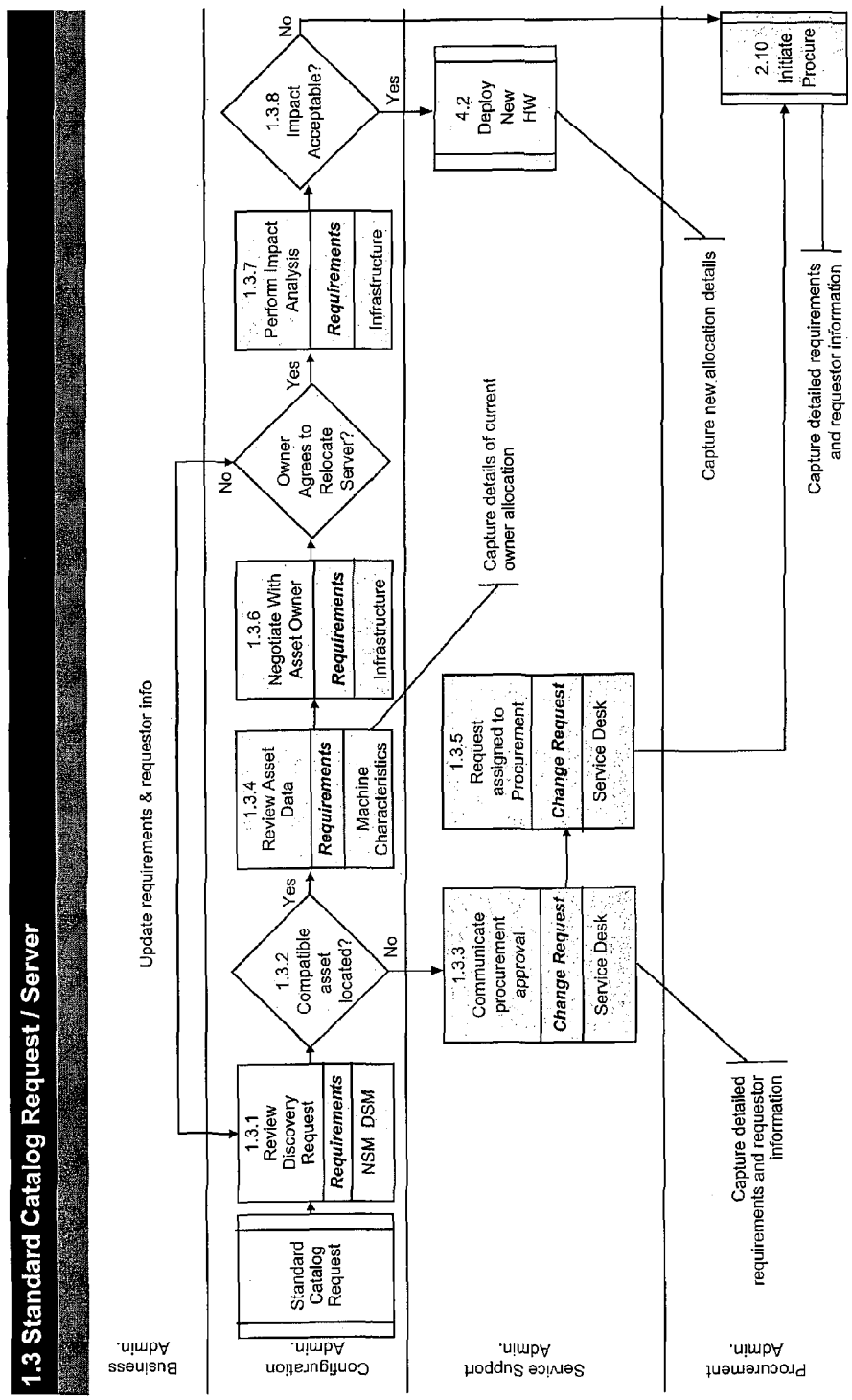
FIG. 4 illustrates a standard catalog request process for a request for a server that can be executed by a system configured to manage IT assets associated with an entity, according to one or more embodiments of the invention.
Figure 5:
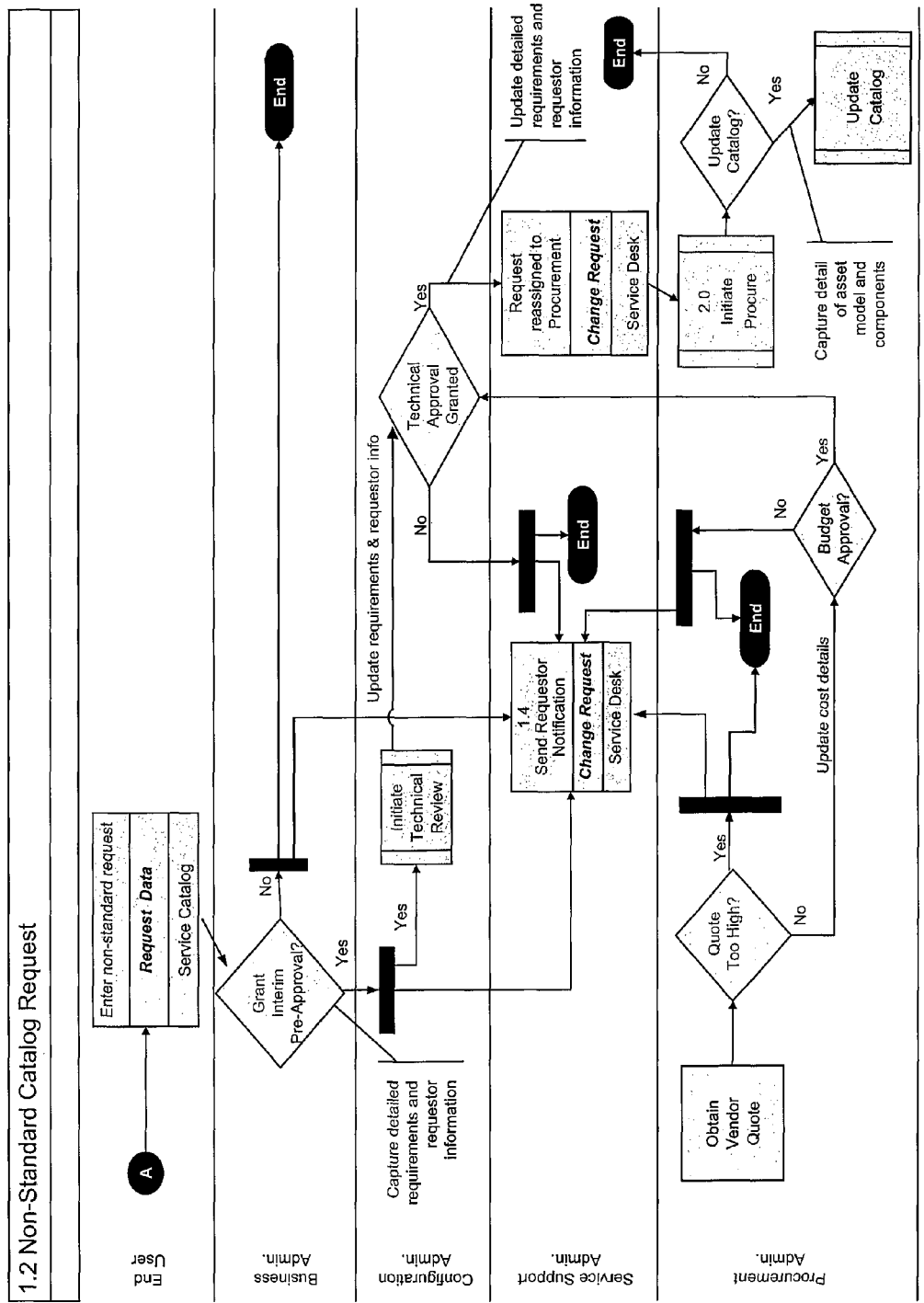
FIG. 5 illustrates a non-standard catalog request process (a request for an IT asset not included in a standardized catalog associated with the entity) that can be executed by a system configured to manage IT assets associated with an entity, according to one or more embodiments of the invention.
Figure 6:
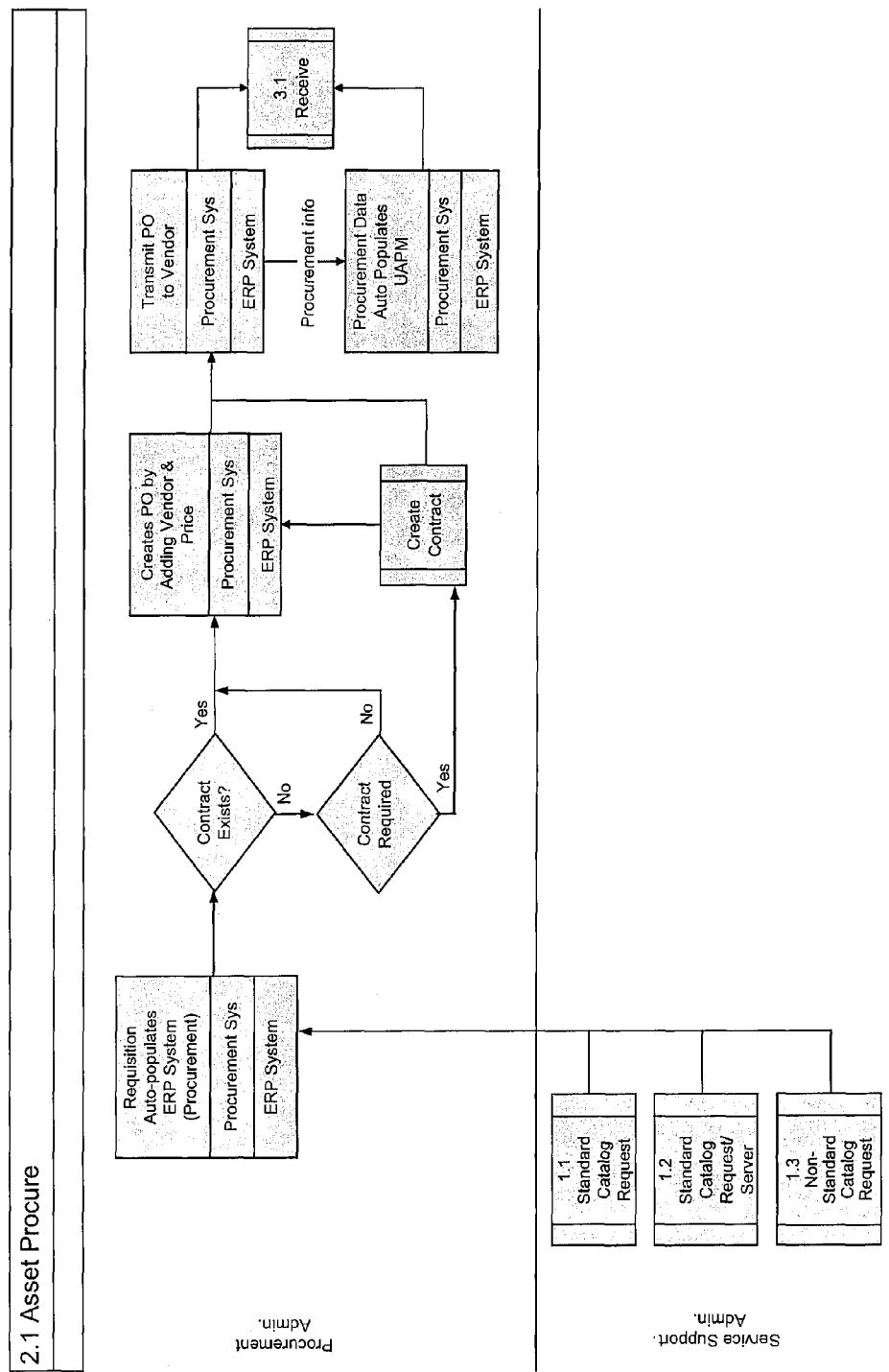
FIG. 6 illustrates an IT asset procurement process that can be executed by a system configured to manage IT assets associated with an entity, according to one or more embodiments of the invention.
Figure 7:
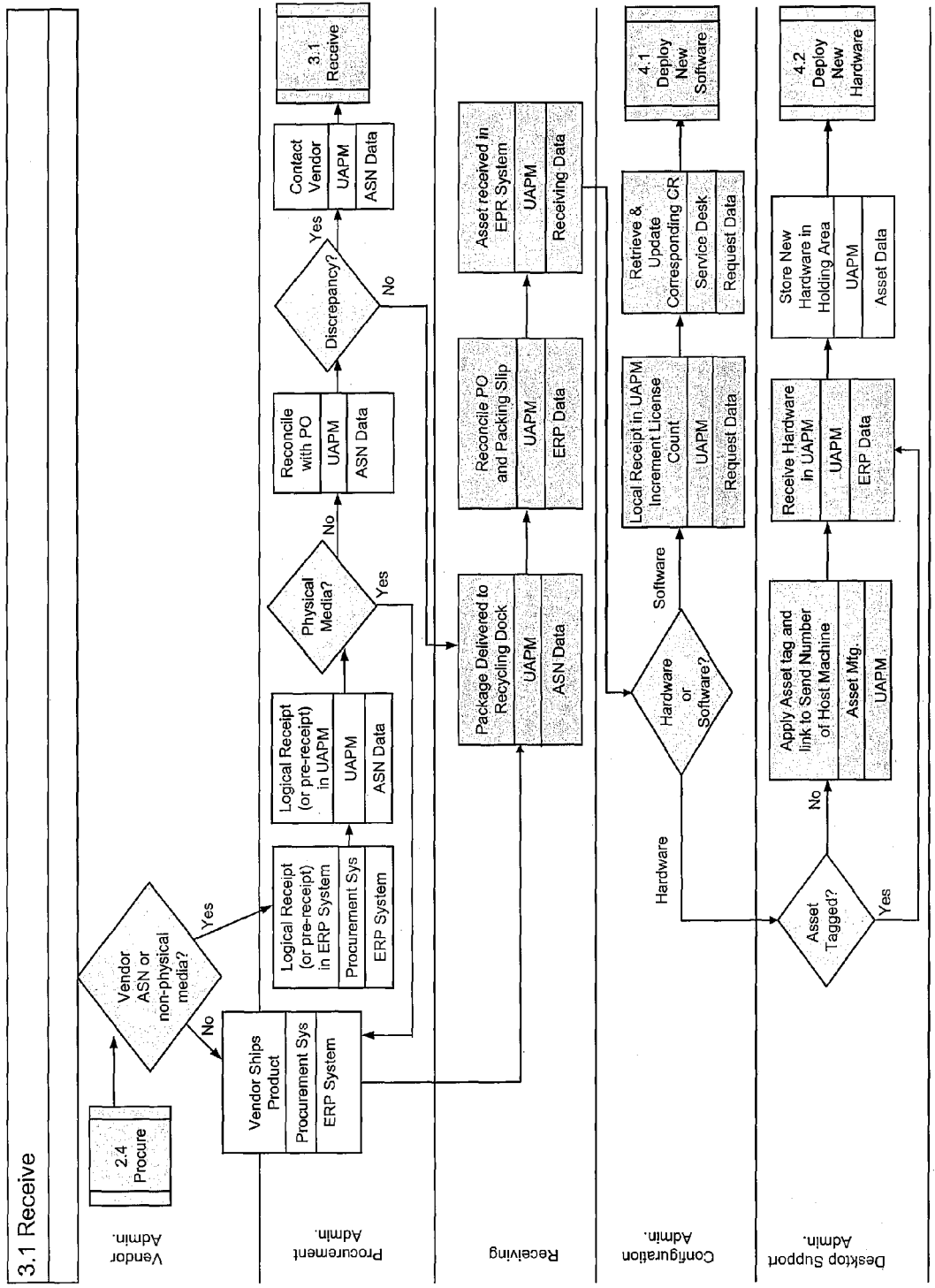
FIG. 7 illustrates an IT asset receipt process that can be executed by a system configured to manage IT assets associated with an entity, according to one or more embodiments of the invention.
Figure 8:
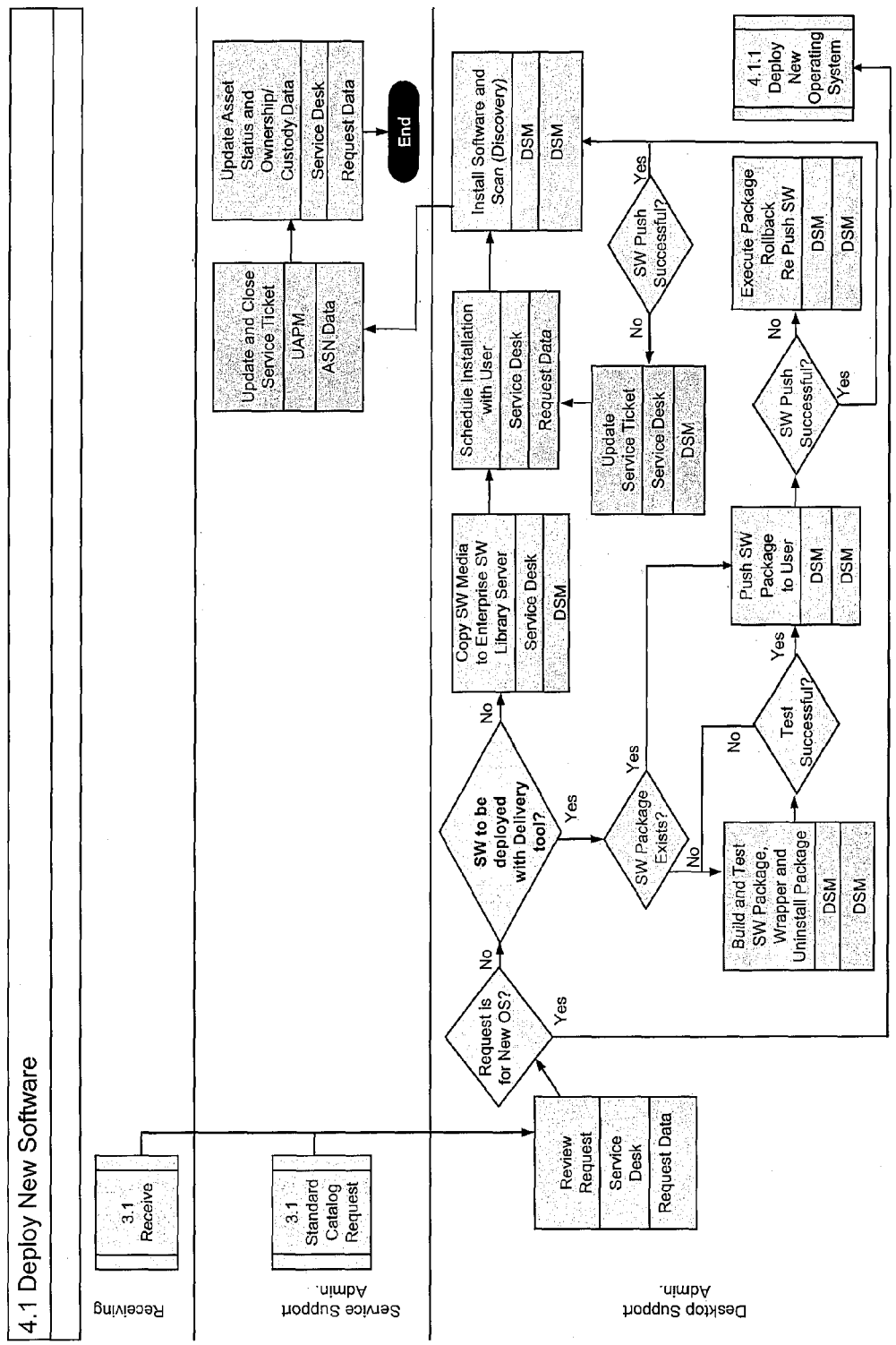
FIG. 8 illustrates a software deployment process that can be executed by a system configured to manage IT assets associated with an entity, according to one or more embodiments of the invention.
Figure 9:
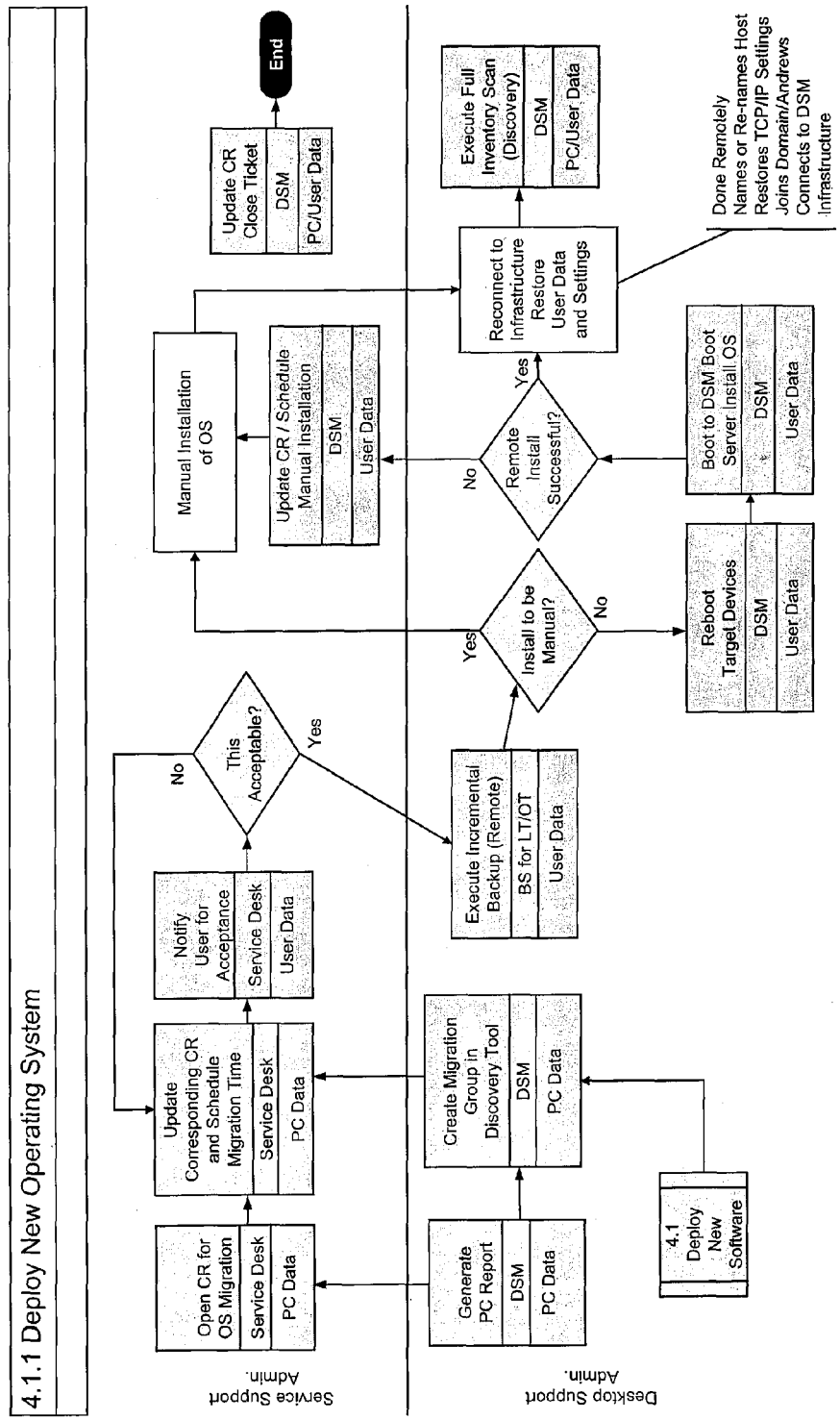
FIG. 9 illustrates an operating system deployment process that can be executed by a system configured to manage IT assets associated with an entity, according to one or more embodiments of the invention.
Figure 10:
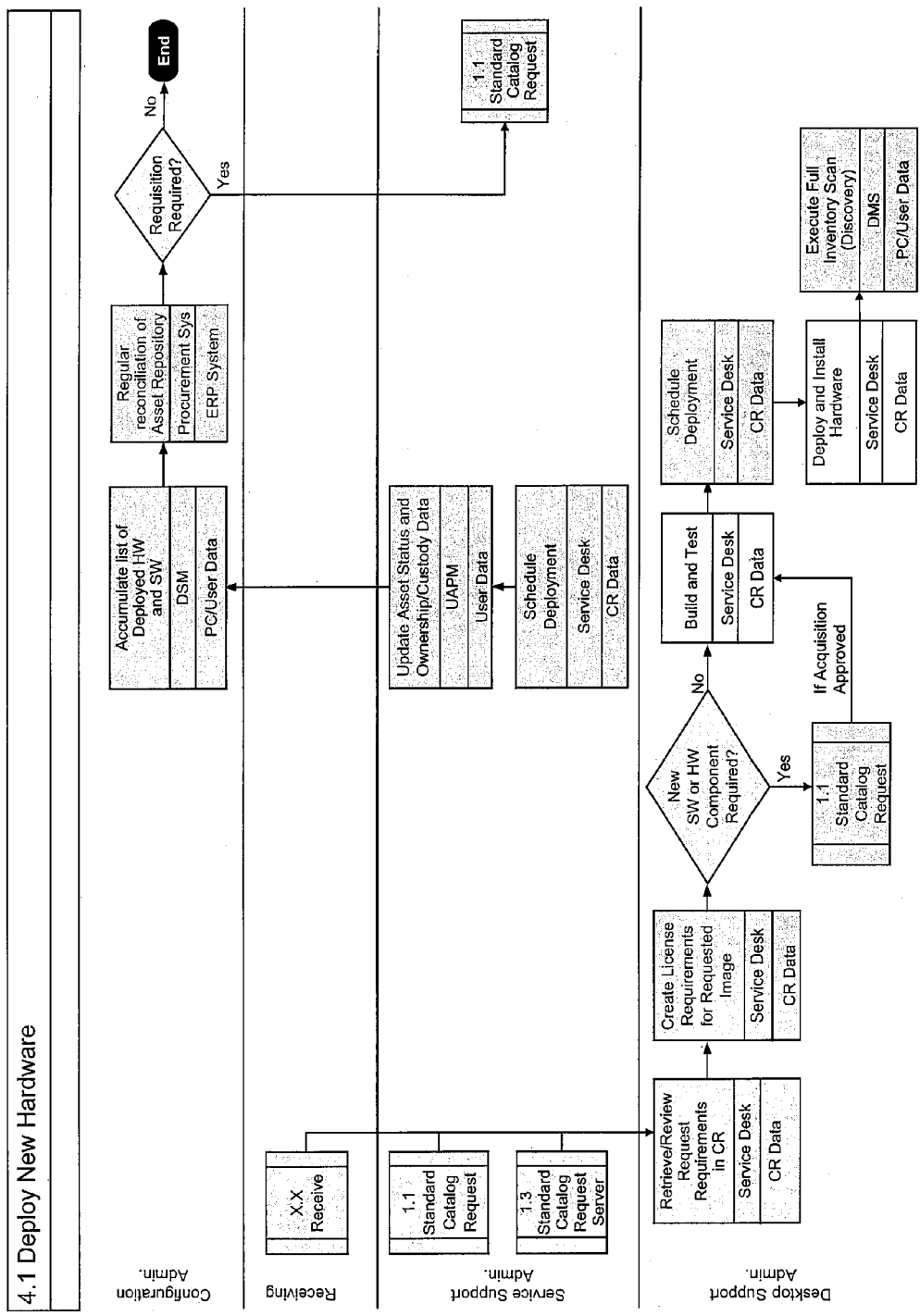
FIG. 10 illustrates a hardware deployment process that can be executed by a system configured to manage IT assets associated with an entity, according to one or more embodiments of the invention.
Figure 11:
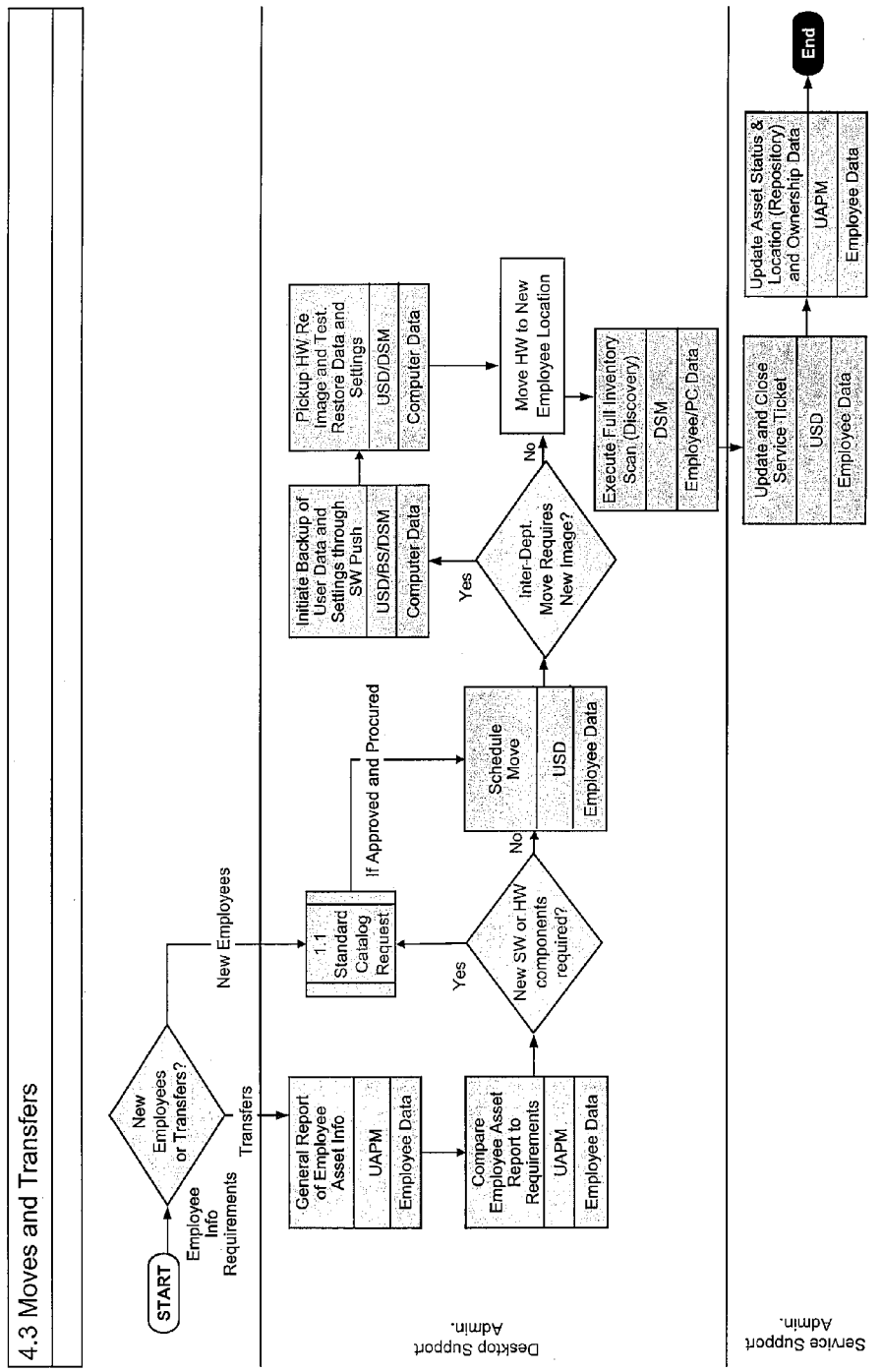
FIG. 11 illustrates a move/transfer process that can be executed by a system configured to manage IT assets associated with an entity, according to one or more embodiments of the invention.
Figure 12:
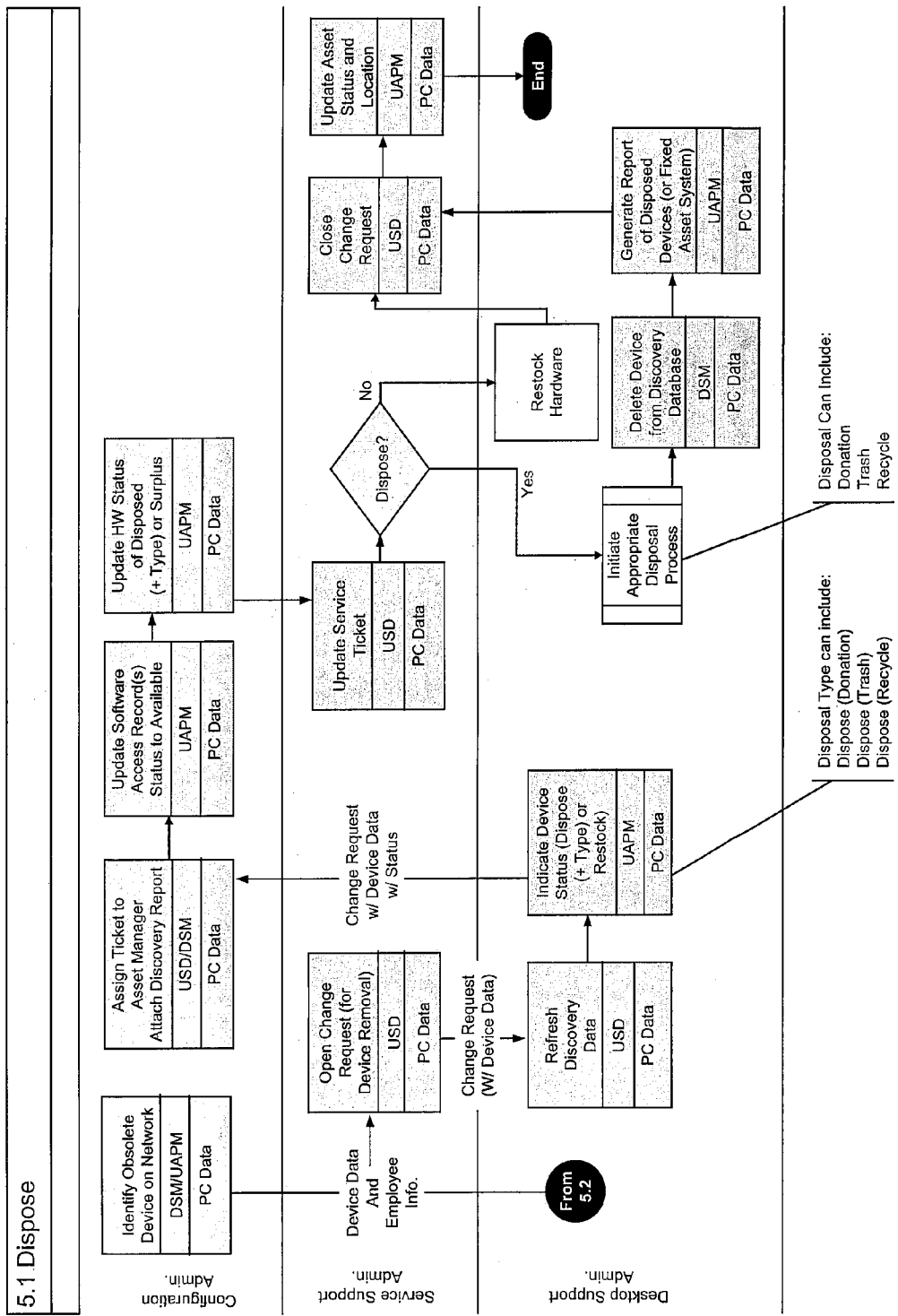
FIG. 12 illustrates a disposal process that can be executed by a system configured to manage IT assets associated with an entity, according to one or more embodiments of the invention.
Figure 13:
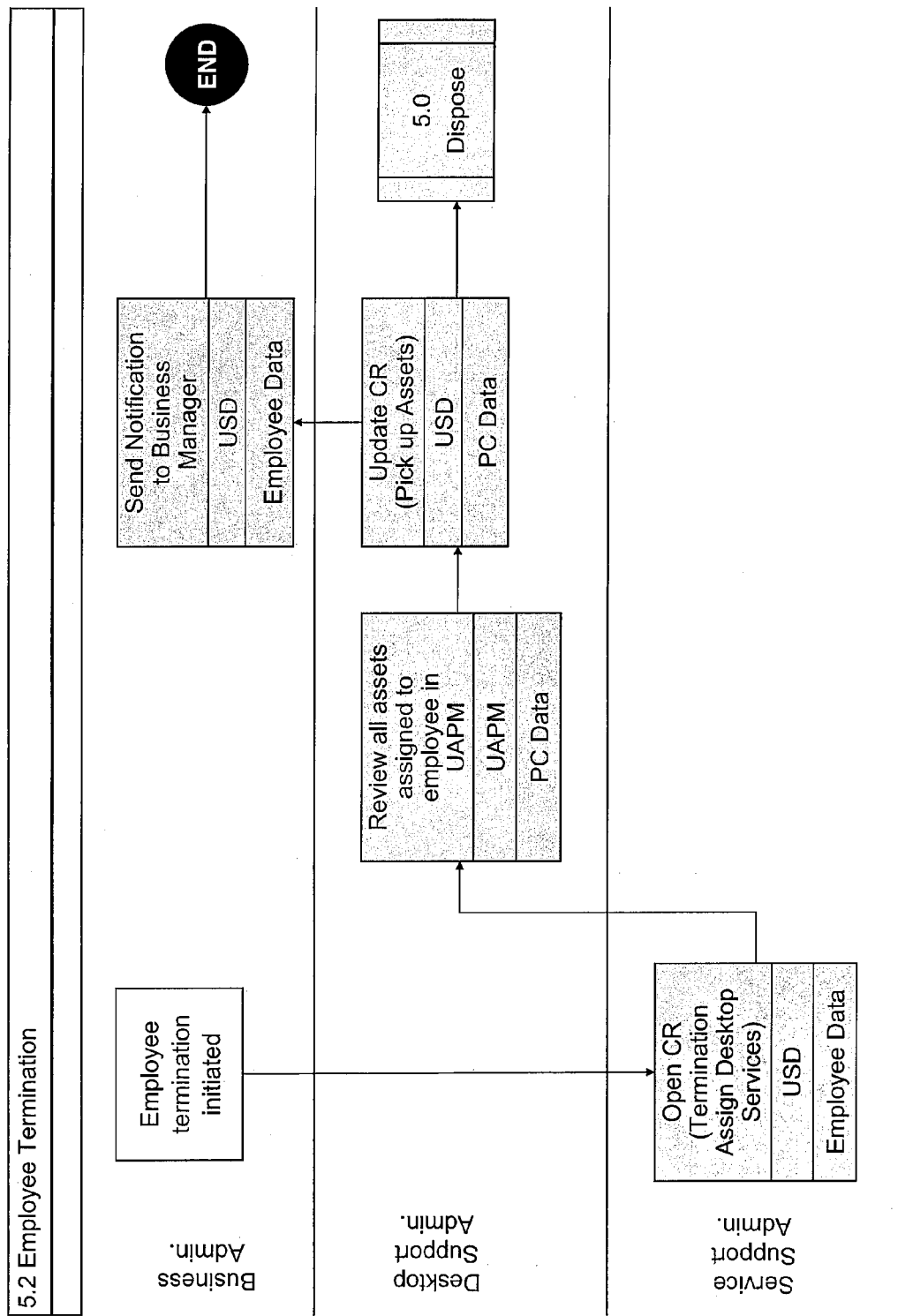
FIG. 13 illustrates an employee termination process that can be executed by a system configured to manage IT assets associated with an entity, according to one or more embodiments of the invention.

As has been discussed above, according to various embodiments, asset process manager 16 may manage workflows associated with processes related to the IT assets. In some of these workflows and processes, actions may be required by one or more of the users and/or administrators. Accordingly, asset process manager 16 may include one or more modules that facilitate interactions by the appropriate users and/or administrators for the processes associated with the IT assets to be accomplished. For example, as is illustrated in FIG. 2, asset process manager 16 may include an end user module 36, a business administrator module 38, a configuration administrator module 40, a desktop support administrator module 42, a procurement administration module 44, a service support administrator module 46, and a vendor administrator module 48. Each of modules 36, 38, 40, 42, 44, 46, and 48 may generate at least a portion of the interface provided by system 10 to the corresponding users and/or administrators. In particular, modules 36, 38, 40, 42, 44, 46, and 48 may enable asset process manager 16 to receive interaction from the users and/or administrators required by the workflows associated with the processes related to the IT assets.

FIGS. 3-13 illustrate workflows associated with various processes that may be managed by asset process manager 16. Operations within the workflows illustrated in these figures have been organized according to the user and/or administrator who would be considered to have authority over the operations. This does not necessarily mean that each operation shown in these workflows would require the participation of the corresponding user and/or administrator, as the information stored within common database 20 may be leveraged to automate some of these operations. However, a user and/or administrator may have access to all corresponding operations to override automated decisions and/or actions where desired.

Figure 14:
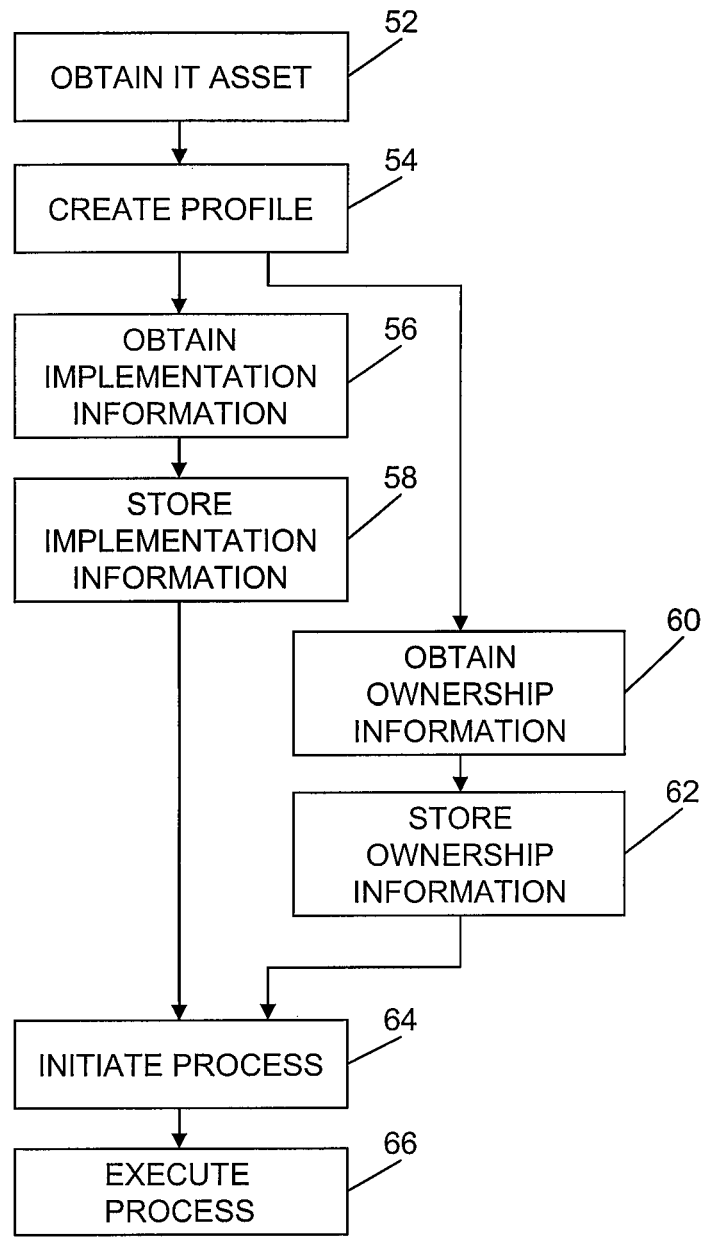
FIG. 14 illustrates a method of managing an IT asset associated with an entity, according to one or more embodiments of the invention.

FIG. 14 illustrates a method 50 of managing an IT asset associated with an entity, in accordance with some embodiments. It should be appreciated that although method 50 is described below with respect to the components of system 10, in some embodiments method 50 may be implemented by systems other than system 10. In some instances, method 50 includes an operation 52 at which the IT asset is obtained. Obtaining the IT asset may include discovering the IT asset, procuring the IT asset, deploying the IT asset, installing the IT asset, or otherwise obtaining the IT asset.

Once the IT asset has been obtained, a profile associated with the IT asset may be created in a common database at an operation 54. For example, the profile may be similar to profiles 26 shown in FIG. 1 and described above. The common database may include a database similar to common database 20 shown in FIG. 1 and described above.

At an operation 56, information related to the implementation of the IT asset may be obtained. The information related to the implementation of the IT asset may include one or more of information related to a physical location of the IT asset, information related to a configuration of the IT asset, information related to one or more assigned end-users of the IT asset, information related to network location of the IT asset, and/or other information related to the implementation of the IT asset. In some implementations, operation 56 may be executed by an asset implementation manager similar to asset implementation manager 12 illustrated in FIG. 1 and described above.

At an operation 58, the obtained information related to the implementation of the IT asset may be stored in the profile created at operation 54. In some instances, operation 58 may be executed by an asset implementation manager similar to asset implementation manager 12 illustrated in FIG. 1 and described above.

At an operation 60, information related to the ownership of the IT asset may be obtained. The information related to the ownership of the IT asset may include one or more of cost information, information related to contractual rights and/or obligations associated with the IT asset, information related to one or more leases associated with the IT asset, information related to one or more licenses associated with the IT asset, information related to one or, more vendors associated with the IT asset, and/or other information related to the ownership of the IT asset. In some instances, operation 60 may be executed by an asset ownership manager similar to asset ownership manager 14 shown in FIG. 1 and described above.

At an operation 62, the obtained information related to the ownership of the IT asset may be stored in the profile created at operation 54. In some instances, operation 58 may be executed by an asset ownership manager similar to asset ownership manager 14 shown in FIG. 1 and described above.

At an operation 64, a process associated with the IT asset may be initiated. The process associated with the IT asset may include one or more of an order, a procurement, a receipt, a configuration change, a payment, a deployment, or a disposal of one or more of the IT asset. In some instances, operation 64 may be executed by an asset process manager 16 similar to asset process manager 16 shown in FIG. 1 and described above. In some instances, operation 64 may be executed in response to a report by a user and/or administrator of an issue related to the functionality of the IT asset (or another IT asset in communication with the IT asset). In such instances, operation 64 may be executed by a service manager that has received the report of the issue similar to service manager 18 shown in FIG. 1 and described above.

At an operation 66, the process initiated at operation 64 may be executed. Executing the process may include accessing and/or modifying information related to the ownership of the IT asset previously stored in the profile created at operation 54. In some instances, operation 66 may be performed by an asset process manager similar to asset process manager 16 shown in FIG. 1 and described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to manage a plurality of information technology (IT) assets associated with an entity, the plurality of IT assets including software assets, hardware assets, or both software and hardware assets, the system comprising:

a common database that stores an asset profile for one or more IT assets of the plurality of IT assets, wherein the asset profile includes information related to the one or more IT assets; and a processor configured to provide:

an asset ownership, manager configured to receive ownership information relating to ownership of the one or more IT assets, wherein the received ownership information is stored in the asset profile, and wherein the asset ownership manager is further configured to generate or modify ownership information that is stored in the asset profile, and an asset process manager configured to receive process information relating to a process associated with the one or more IT assets, wherein the process includes passing information by at least a first participant to a second participant, wherein the first participant or the second participant is an IT asset from the one or more IT assets, wherein the received process information is stored in the asset profile, and wherein the asset process manager is further configured to generate or modify process information that is stored in the asset profile.

2. The system of claim 1, wherein the processor is further configured to provide an asset implementation manager configured to receive implementation information relating to use of the one or more IT assets, wherein the received implementation information is stored in the asset profile, and wherein the asset implementation manager is further configured to generate or modify information that is stored in the asset profile.

3. The system of claim 2, wherein the asset implementation manager is further configured to receive implementation information by discovering the one or more IT assets, and wherein the asset implementation manager is further configured to monitor an inventory of the one or more IT assets, monitor a configuration of the one or more IT assets, or monitor usage of the one or more IT assets.

4. The system of claim 2, wherein the processor is further configured to provide a service manager configured to receive service information relating to functionality of the one or more IT assets, wherein the received service information is stored in the asset profile, and wherein the service manager is configured to generate or modify information that is stored in the asset profile.

5. The system of claim 2, wherein the ownership information includes information relating to cost of an IT asset, information related to contractual rights or obligations associated with an IT asset, information related to a lease associated with an IT asset, information related to a license associated with an IT asset, or information related to a vendor associated with an IT asset.

6. The system of claim 2, wherein the asset process manager is further configured to:
  receive a command to initiate a given process,
  initiate the given process,
  monitor the given process,
  request an authorization for the given process,
  receive the authorization for the given process, and
  determine the given process has been completed.

7. The system of claim 6, wherein the given process comprises an order, a procurement, a receipt, a payment, a configuration change, a deployment, or a disposal of the one or more IT assets.

8. The system of claim 2, wherein the service manager is further configured to receive a report of an issue related to the functionality of one of the one or more IT assets, initiates a given process to address the issue, monitors the given process that addresses the issue, and closes the issue.

9. The system of claim 2, wherein the one or more IT assets includes a telecommunications asset.

10. A method of managing an information technology (IT) asset, the method executed by a processor configured to perform a plurality of operations, the operations comprising:
  discovering the IT asset;
  creating a profile in a common database that is associated with the IT asset;
  obtaining implementation information related to use of the IT asset by monitoring use of the IT asset;
  storing the implementation information in the profile;
  obtaining ownership information related to ownership of the IT asset;
  storing the ownership information related to the ownership of the IT asset in the profile;
  initiating a process associated with the IT asset, wherein the process includes at least a first participant passing information to a second participant, wherein the first participant or the second participant is the IT asset; and
  storing information relating to the initiated process in the profile.

11. The method of claim 10, wherein the IT asset comprises one or more of a hardware asset, a software asset, or a telecommunications asset.

12. The method of claim 11, wherein the implementation information comprises information related to a physical location of the IT asset, information related to a configuration of the IT asset, information related to an assigned end-user of the IT asset, or information related to network location of the IT asset.

13. The method of claim 11, wherein the ownership information comprises one or more of cost information, information related to contractual rights and/or obligations associated with the IT asset, information related to a lease associated with the IT asset, information related to a license associated with the IT asset, or information related to a vendor associated with the IT asset.

14. The method of claim 11, wherein the initiated process comprises one or more of an order, a procurement, a receipt, a configuration change, a payment, a deployment, or a disposal of the IT asset.

* * * * *

UNITED STATES PATENT AND TRADEMARK OFFICE
CERTIFICATE OF CORRECTION

PATENT NO. : 8,504,683 B2
APPLICATION NO. : 12/813320
DATED : August 6, 2013
INVENTOR(S) : Charles Edwin Ellisor, Jr.

It is certified that error appears in the above-identified patent and that said Letters Patent is hereby corrected as shown below:

In the Claims:

Column 14, line 46 (claim 1, line 11) please change "ownership, manager" to -- ownership manager --

Signed and Sealed this
Twenty-ninth Day of October, 2013

Teresa Stanek Rea
*Deputy Director of the United States Patent and Trademark Office*